United States Patent

Järvenkylä et al.

(10) Patent No.: US 8,453,310 B2
(45) Date of Patent: Jun. 4, 2013

(54) MAKING AN ELONGATED PRODUCT

(75) Inventors: Jyri Järvenkylä, Hollola (FI);
Franz-Josef Riesselmann, Lohne (DE);
Ralf Winterstein, Meiningen (DE);
Reinhold Freermann, Ochtrup (DE);
Lars Hoving, Västerås (SE)

(73) Assignee: Uponor Innovation AB, Fristad (SE)

( * ) Notice: Subject to any disclaimer, the term of this patent is extended or adjusted under 35 U.S.C. 154(b) by 853 days.

(21) Appl. No.: 12/162,528

(22) PCT Filed: Feb. 2, 2007

(86) PCT No.: PCT/FI2007/050061
§ 371 (c)(1),
(2), (4) Date: Oct. 29, 2008

(87) PCT Pub. No.: WO2007/088253
PCT Pub. Date: Aug. 9, 2007

(65) Prior Publication Data
US 2009/0304967 A1 Dec. 10, 2009

(30) Foreign Application Priority Data

Feb. 3, 2006 (EP) .................................. 06101239

(51) Int. Cl.
*B23P 11/02* (2006.01)
(52) U.S. Cl.
USPC .......................................................... 29/447
(58) Field of Classification Search
USPC .......................................................... 29/447
See application file for complete search history.

(56) References Cited

U.S. PATENT DOCUMENTS

| 3,720,557 | A | 3/1973 | Longoni et al. |
| 4,144,111 | A | 3/1979 | Schaerer |
| 5,222,284 | A | 6/1993 | Maddock |
| 6,422,865 | B1* | 7/2002 | Fischer ........................ 433/81 |
| 6,668,457 | B1* | 12/2003 | Czaplicki .................. 29/897.1 |
| 2002/0005223 | A1 | 1/2002 | Campagna et al. |
| 2006/0263557 | A1* | 11/2006 | Watson ..................... 428/36.91 |

FOREIGN PATENT DOCUMENTS

| DE | 2139388 | 2/1973 |
| EP | 0 125 788 | 11/1984 |
| EP | 0494755 | 7/1992 |
| GB | 631127 | 10/1949 |

(Continued)

OTHER PUBLICATIONS

Machine Translation of DE 2139388 Feb. 1973.*

(Continued)

*Primary Examiner* — David Bryant
*Assistant Examiner* — Moshe Wilensky
(74) *Attorney, Agent, or Firm* — Occhiuti Rohlicek & Tsao LLP

(57) ABSTRACT

An elongated product is formed such that first a core is formed, the outer surface of the core being made of plastic. Thereafter, a tubular metal layer is extruded such that the layer is seamless. When the metal layer is extruded, a clearance (16) is allowed between the metal layer and the core. After the metal layer has cooled, the outer surface of the core is arranged against the inner surface of the metal layer. An adhesive action is arranged between the core and the metal layer and a permanent compressive force is arranged, which compressive force compresses the core and the metal layer together.

12 Claims, 2 Drawing Sheets

FOREIGN PATENT DOCUMENTS

| | | |
|---|---|---|
| GB | 2274795 | 8/1994 |
| JP | 1040315 | 2/1969 |
| JP | 49-123964 | 11/1974 |
| JP | 54-116070 | 9/1979 |
| JP | 54129066 * | 10/1979 |
| JP | 60210428 | 10/1985 |
| JP | 3-27812 * | 2/1991 |
| JP | 03-027813 | 2/1991 |
| JP | 05-169574 | 7/1993 |
| JP | 9070887 | 3/1997 |
| JP | 409070887 | 3/1997 |
| WO | 0234424 | 5/2002 |
| WO | 2005/080077 | 9/2005 |

OTHER PUBLICATIONS

Written Opinion of the International Searching Authority for International Application No. PCT/FI2007/050061, dated Apr. 27, 2007, 6 pages.

* cited by examiner

MAKING AN ELONGATED PRODUCT

CROSS-REFERENCE TO RELATED APPLICATIONS

This application is the National Stage of International Application No. PCT/FI2007/050061 filed Feb. 2, 2007, which claims the priority of European Application No. 06101239.9, filed on Feb. 3, 2006. The contents of both applications are hereby incorporated by reference in their entirety.

BACKGROUND OF THE INVENTION

The invention relates to a method of manufacturing an elongated product comprising forming a core having an outer layer of plastic, extruding a seamless metal layer on the core allowing a clearance between the metal layer and the core, cooling the metal layer, and arranging the outer surface of the core against the inner surface of the metal layer.

The invention further relates to an elongated product comprising a core having an outer surface of plastic and a seamless tubular metal layer extruded on the core.

Multilayer composite pipes which have an inner and an outer layer of plastic and an aluminium layer between the inner and outer layers are well known. Such pipes are made for example such that the inner layer is extruded and coated with tie material. Thereafter, an aluminium band is wrapped around the inner layer and welded such that a longitudinal welding seam is formed. The welded aluminium layer is calibrated and the tie material is activated for bonding the inner layer with the aluminium layer. Thereafter, the aluminium layer is coated with tie material and an outer plastic layer is extruded on the aluminium layer. Such a solution is disclosed for example in EP 0691193. It is also possible to make the pipe such that first the aluminium band is wrapped to form a pipe such that the edges of the aluminium band overlap. Thereafter, the overlapped areas are longitudinally welded with ultrasonic welding. It is also possible to wrap the band such that the edges do not overlap and use butt-welding. Thereafter, the formed aluminium pipe is coated from the inside with tie material and plastic material forming the inner layer, and the outside of the aluminium layer is coated with tie material and plastic that forms the outer layer. One of the greatest weaknesses in this system is the fact that the tie layer remains under constant tensile forces as the plastic is trying to shrink away from the metal layer. In both technologies, it is very difficult to make the welding seam in a reliable way and such that the quality of the welding seam is even. Irregularities in the welding seam could lead to breaks of pipes and the welding seam quite easily breaks during expanding of the pipe end.

DE 2139388 discloses making of a pipe that has an inner layer made of plastic. Seamless metal layer, for example of aluminium, is pressed on the outside of the plastic layer. The aluminium is pressed directly on the plastic core. The temperature of the pressed aluminium is so high that it easily melts and damages the plastic core.

EP 0125788 also discloses extruding a seamless metal layer outside a plastic core. A mandrel is provided with an internal cooling shroud to protect the core from the hot pressed metal. The metal is extruded with an internal diameter greater than the external diameter of the core to permit the intervention of a portion of the cooling shroud and subjected to a stream of cooling air. To eliminate the space between the core and the pressed metal so that the core is tightly clad in a tubular sheath, it is necessary that the extrusion stage be followed by a step in which the metal tube is drawn or swagged down. However, this step work-hardens the cladding, making the product difficult to manipulate. Thus, the hardness of the product increases and the product becomes stiffer.

U.S. Pat. No. 5,222,284 discloses making a coaxial cable. An elongated core consisting of a conductor coated with an insulator is continuously compacted to reduce the cross-section of the core. A tubular metal cladding is continuously extruded outside of the elongated core and simultaneously the compacted core is continuously fed into the cladding, whereby the compacted core recovers towards its original cross-section to fill the cladding. Thus the core does not touch the metal cladding while the metal is still hot and therefore the damaging of the insulator can be avoided. Further, because the diameter of the metal cladding is not reduced, the hardening of the metal is avoided. However, the outer layer of the core must be made from an insulating material that can be compacted to reduce its cross-section by the application of compressive force. Further, the insulating material must be such that it gradually recovers such that the core tends to return to the original dimensions when the compressive force is relieved. The solution is rather complicated. Further, it is rather difficult to ensure the adhesion between the core and the metal cladding. The patent is totally silent of adhesion levels between the layers.

BRIEF DESCRIPTION OF THE INVENTION

The object of the invention is to provide a new type of method of making an elongated product and an elongated product.

The method of the invention is characterized by arranging an adhesive action between the core and the metal layer, and arranging a permanent compressive force for compressing the core and the metal layer together.

Further, the product of the invention is characterized in that there is an adhesive action between the core and the metal layer and a permanent compressive force, which compresses the core and the metal layer together.

In the invention, an elongated product is formed. First a core is formed, the outer surface of the core being made of plastic. Thereafter, a tubular metal layer is extruded such that the layer is seamless. The inner diameter of the metal layer, when extruded, is larger than the outer diameter of the core such that the metal layer does not contact the core. After the metal layer has cooled, the outer surface of the core is arranged against the inner surface of the metal layer. An adhesive action is arranged between the core and the metal layer. Further, a permanent compressive force is arranged, which compressive force compresses the core and the metal layer together. There are several solutions for providing the compressive force. One solution is that there is foaming agent in the outer surface of the core and the foaming agent is activated such that the foam presses against the metal layer. Another solution is that originally, the outer diameter of the core is larger than the inner diameter of the metal layer and the outer diameter of the core is reduced before the seamless metal layer is extruded on the core and the material of the core has a memory effect, whereby the core tends to expand to the original diameter. Yet, another solution is that the diameter of the metal layer is reduced to such an extent that there is a compressive force that compresses the core and the metal layer together. It is also possible to provide the compressive force by applying two or more of the solutions in combination. The solutions provide the advantage that the adhesive interface between the core and the metal layer is not under tensile stress. Thus, the core and the metal layer remain very well adhered together. Thus, the long-term properties of the pipe are extremely good.

BRIEF DESCRIPTION OF THE FIGURES

The invention will be described in more detail in the attached drawing, wherein.

In the figures, the invention is presented in a simplified manner for the sake of clarity. In the figures, like parts are designated by like reference numerals.

DETAILED DESCRIPTION OF THE INVENTION

Figure 1:
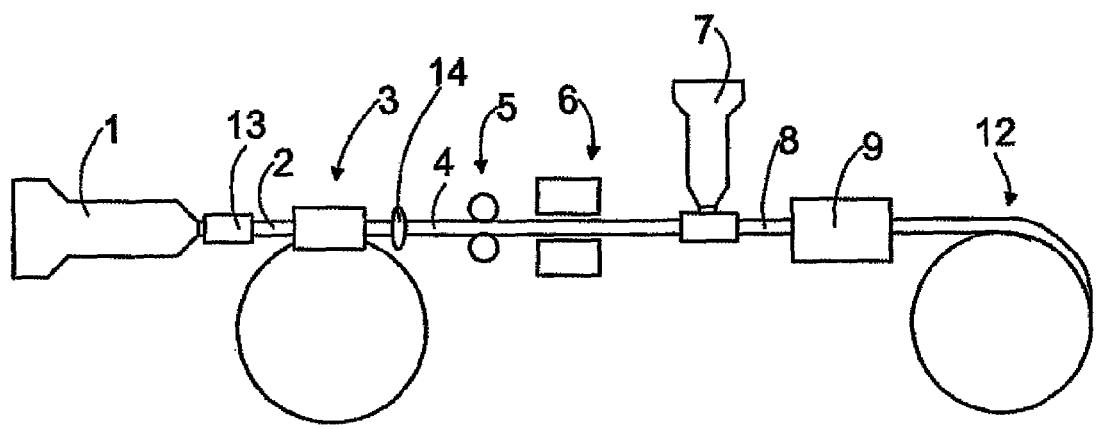
FIG. 1 is a schematic side-view of a pipe manufacturing apparatus.
Figure 2:
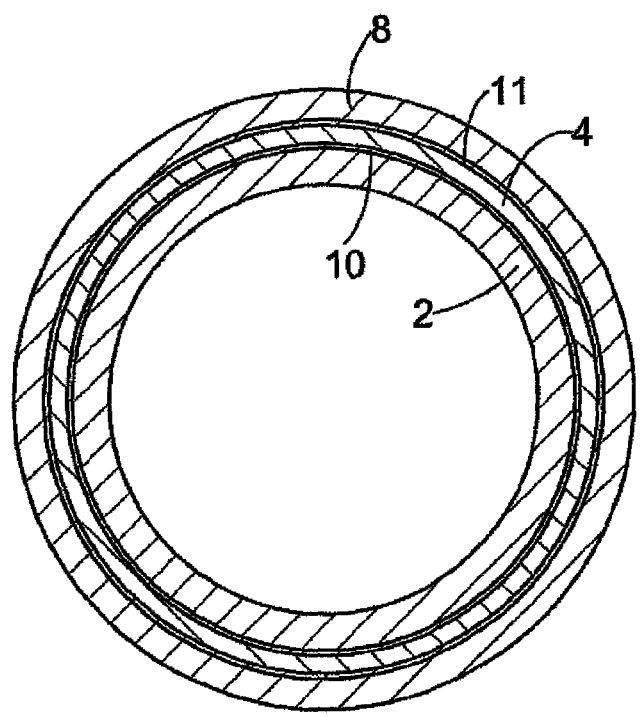
FIG. 2 is an end-view in cross-section of a multilayer composite pipe.

FIG. 1 discloses how a multilayer composite pipe having a seamless aluminium layer between plastic layers is formed. FIG. 2 shows an example of such a pipe.

First an inner layer 2 of the pipe is extruded with a first plastic extruder 1. The inner layer 2 forms the core of the pipe. There is a calibration/cooling basin 13 after the first plastic extruder. The inner layer 2 is coated with a tie layer. Thus, in the formed pipe there is an inner tie layer 10 between the inner layer 2 and the aluminium layer 4. The inner tie layer 10 and the inner layer 2 can also be co-extruded. A tie layer is not needed if the inner layer 2 is made of high molecular weight plastic that itself has good adhesive properties due to grafted functional endgroups, for example.

The inner layer can be extruded, for example, of polyethylene PE, cross-linked polyethylene PEX, polypropylene PP or polybutylene-1 PB, etc. The tie layer may contain, for example, polyethylene PE with maleic anhydride.

The inner layer 2 is fed into the metal extrusion machine 3. The metal extrusion machine 3 comprises a rotatably mounted wheel having an endless circumferential groove. A shoe is adapted to close part of the groove and mount tooling, which includes an abutment arranged to at least partially block the groove and a passage leading into a die structure. Metal feedstock is inserted into the rotating grooved extrusion wheel. The metal is heated and pressurised by friction. The material engages the abutment in a condition in which it flows through the passage and is extruded through the die structure. The die structure produces a tubular seamless layer of metal and the inner layer 2 is passed through a hollow mandrel in the die structure. A sufficient clearance is allowed between the metal layer and the inner layer to prevent heat damage to the inner layer. The extruded metal can be aluminium such that an aluminium layer 4 is formed. The metal can also be, for example, copper or magnesium or some other metal having rather a low melting point. A suitably low melting point can be achieved, for example, by alloying aluminium with other metals.

After the extrusion, the aluminium layer 4 cools down. At this point, external cooling means can also be used. The cooling means can, for example, be a ring-shaped cooling nozzle 14 that blows cooling air onto the aluminium layer 4. The temperature of the extruded aluminium is about 450° C., which means that the surface of the inner layer 2 would get damaged if the aluminium layer 4 did not cool down before it contacts the surface of the inner layer 2.

After cooling, the aluminium layer 4 can be led through forming rolls 5. The number of the forming rolls may be 2, 3 or 4 or more, depending on the structure of the forming rolls. The forming rolls 5 perform a draw down process, which means that the diameter of the aluminium layer 4 is reduced such that the aluminium layer 4 gets in contact with the plastic inner layer 2. Preferably the diameter of the aluminium layer 4 is reduced to such an extent that there is a compressive force between the inner layer 2 and the aluminium layer 4. Reducing the diameter of the aluminium layer can also be performed, for example, by using conical convergent dies or by using another suitable method.

Thereafter, the material of the inner tie layer 10, or the material of the inner layer 2 itself if a tie layer is not used, is activated such that the inner layer 2 and the aluminium layer 4 adhere together. The material of the inner tie layer 10 can be activated, for example, by heating it. The material of the tie layer 10 may comprise un-reacted foaming agent. When the material is heated, the foaming agent reacts and the material effectively fills the gap between the inner layer 2 and the aluminium layer 4. Thus, the tolerances between the layers need not be very strict. If the foamed tie material is not a closed cell, it forms a leakpath for collected condensates such that a collection of water moisture or some other fluid between the plastic layer and the barrier layer can be eliminated. Preferably the amount of the material of the inner tie layer 10 and/or the amount of the foaming agent and/or the foaming degree of the tie material is such that the foamed tie material presses against the aluminium layer 4. Thus, there is a compressive force between the core, which comprises the inner layer 2 and the inner tie layer 10, and the aluminium layer 4.

Next in the process line is the heating means 6. Preferably, the heating means 6 is an inductive heating means for heating the aluminium layer 4. The aluminium layer 4 is heated by the heating means 6 to the annealing temperature or to a temperature that is high enough for activating the adhesive material. The annealing temperature may be, for example, higher than 300° C.

Because the annealing must not damage the material of the inner layer 2, its temperature resistance must be adequate for the possible annealing. Preferable examples of the material are cross-linked polyethylene PEX, poly(tetrafluoroethylene) PTFE, fluoroethylene propylene FEP, perfluoro alkoxyl alkane PFA, ethylene tetrafluoroethylene co-polymer ETFE, ethylenechlortrifluorethylen E-CTFE, poly(vinylidenefluoride) PVDF and poly(vinyl fluoride) PVF.

The temperature resistance of the tie material must also be adequate if annealing is used. A sufficient temperature resistance can be achieved, for example, by forming the tie material from a material that has rather a high molecular weight and adhesive properties formed by grafting functional end groups to the base material. The temperature resistance of the tie material may also be improved by adding suitable additive or additives to the tie material. A fire-protecting agent used in connection with plastic pipes is a suitable additive. Examples of such additives are short-cut fibre glass, ceramic whiskers fibres, aluminium trihydrate ATH, ermiculite, silicate, phosphate, carbon and carbonaceous agents.

If the tie material has a good temperature resistance, it also simultaneously protects the material of the inner layer. The tie material may also comprise a foaming agent, such as azodicarbonamide, which reacts when the aluminium layer 4 is annealed. Thus, the foamed tie material forms an insulating layer which thermally protects the inner layer 2.

Annealing the aluminium layer 4 gives the pipe a higher flexibility. The stiffness of the pipe can be controlled by selecting how high the annealing temperature is and how long the annealing time is. For example, if the pipe is used in mounting inside the structures, such as in floor heating, whereby high flexibility is needed, the annealing temperature is higher and/or the annealing time is longer. Correspondingly, if surface mounting is used, such as in renovation, whereby stiffer pipes are needed, the annealing temperature is lower and/or the annealing time is shorter. The annealing of the aluminium layer 4 and activating of the material in the inner tie material 10 can be combined such that both steps are made by the heating means 6.

After the heating means 6, the outer surface of the aluminium layer 4 is coated with the tie layer such that an outer tie layer 11 is formed. Thereafter, the outer layer of plastic is formed. It is possible to co-extrude the material of the outer tie layer 11 and the plastic material forming the outer layer 8 together with the second plastic extruder 7. The material of the outer tie layer 11 can be the same as the material for the inner tie layer 10. Also the material for the plastic outer layer 8 may be selected from the same materials as the materials for the plastic inner layer 2.

The diameter of the pipe is typically in the range from 2 to 2000 mm. The wall thicknesses vary accordingly. Typically the amount of the adhesive material is kept as low as possible. If the outer diameter of the pipe is 17 mm, in one example the thickness of the inner layer 2 and the thickness of the outer layer 8 are typically close to 1 mm, the barrier layer 4 of aluminium is about 0.3 mm and the thickness of the adhesive material is about 50 micrometers.

After the extrusion of the outer layer 8, the pipe is cooled by the cooling means 9. After cooling, the pipe is wound on a drum 12.

If the core is made of a material having a memory effect, such as cross-linked polyethylene PEX, there can be reducing means for reducing the outer diameter of the core before it passes to the metal extrusion machine 3. In such a case, the diameter of the metal layer does not have to be reduced very much or at all, which reduces or avoids the hardening of the metal. The core expands to the original diameter when, for example, the core is heated by the heating means 6.

Figure 3:
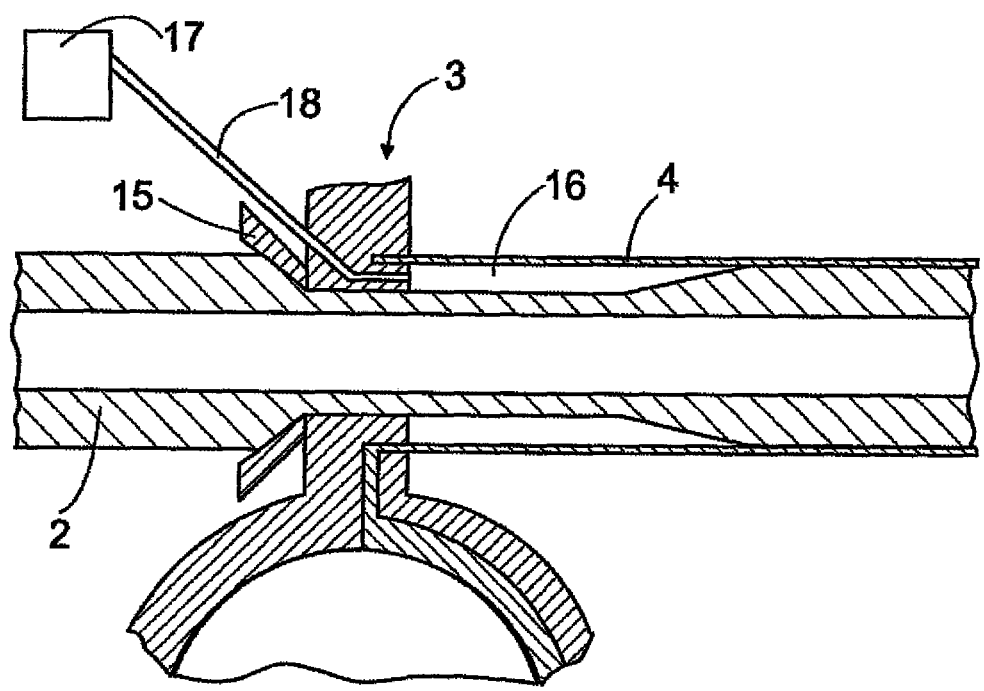
FIG. 3 is a schematic cross-sectional side-view of a detail of a metal extrusion machine.

In the solution shown in FIG. 3, the outer diameter of the inner layer 2 is reduced with a conical reducing ring 15. Instead of a conical reducing ring, the reducing means can be formed of forming rolls, for example. Thus, a clearance 16 is formed between the inner layer 2 and the aluminium layer 4. The original outer diameter of the inner layer 2 is larger than the inner diameter of the aluminium layer 4. Because the material of the inner layer 2 has a memory effect, it tries to expand to its original diameter. Because the inner diameter of the aluminium layer 4 is smaller than the original diameter, there is a compressive force between the inner layer 2 and the aluminium layer 4 after the inner layer 2 has expanded against the aluminium layer 4.

If the clearance 16 is hermetically closed, its inner pressure can be controlled by a suction pump 17, for example, which is connected to the clearance 16 through a channel 18. By controlling the pressure in clearance 16, it is possible to control how soon the inner layer contacts the aluminium layer 4. A high pressure in the clearance 16 prevents the inner layer 2 from contacting the aluminium layer 4 too early. If the pressure is lower, the inner layer 2 contacts the aluminium layer 4 sooner. The adhesion between the inner layer 2 and the aluminium layer 4 can be improved by sucking a vacuum into the clearance 16.

The feeding speed of the inner layer 2 can be controlled. It is possible to arrange the feeding speed of the inner layer to be slightly higher than the speed of extrusion of the aluminium layer 4. Such a solution improves the contact between the inner layer 2 and the aluminium layer 4.

An elongated mandrel can be positioned inside the inner layer 2. This mandrel can be a mandrel of the first plastic extruder 1, for example. This mandrel can be used to press the inner layer 2 against the aluminium layer 4. It is also possible to close the outgoing end of the pipe and arrange an internal overpressure inside the inner layer 2. This overpressure can be arranged by supplying pressurised air through the mandrel, for example. The internal overpressure can be used for pressing the inner layer 2 against the aluminium layer 4.

The extrusion nozzle that extrudes the aluminium layer 4 can be cooled by applying cooling gas, such as nitrogen, to the nozzle, for example. Cooling of the nozzle also cools the aluminium layer.

The core need not be extruded simultaneously on-line with the extrusion of the metal layer. The core can be made beforehand in a separate process. The core can be made even in a separate factory and transported to the factory where the metal extrusion machine is. The beforehand made core can be fed to the metal extrusion machine 3 after transportation and/or storage.

In some cases, the features disclosed in this description can be used as such regardless of the other features. On the other hand, the features disclosed in this description can be combined for forming various combinations.

For a man skilled in the art, it is obvious that in the course of technical progress, the basic idea of the invention can be carried out in numerous ways. Thus, the invention and its embodiments are not limited by the previous examples but they may vary within the scope of the appended claims. Thus, the elongated product formed with the method and apparatus described above can also be—instead of the pipe as described above—for example a cable.

The invention claimed is:

1. A method of manufacturing an elongated product, said method comprising forming a core having an outer surface of plastic, extruding a seamless metal layer on the core allowing a clearance between the metal layer and the core, cooling the metal layer, arranging the outer surface of the core against the inner surface of the metal layer, arranging an adhesive action between the core and the metal layer by activating a material adhering the core and the metal layer together by heat, sucking a vacuum in said clearance for improving the adhesion between the core and the metal layer, and arranging a permanent compressive force for compressing the core and the metal layer together.

2. The method of claim 1, wherein the core comprises foaming agent and the foaming agent is activated such that a foam presses against the metal layer.

3. The method of claim 1, further comprising reducing the diameter of the metal layer to such an extent that the metal layer presses against the core.

4. The method of claim 3, further comprising annealing the metal layer for increasing its flexibility after the diameter of the metal layer has been reduced.

5. The method of claim 1, wherein the original diameter of the core, before the seamless metal layer is extruded on the core, is larger than the inner diameter of the metal layer, the outer diameter of the core is reduced before the seamless metal layer is extruded on the core, and the material of the core has a memory effect such that after the seamless metal layer is extruded on the core, the core tends to expand to its original diameter.

6. The method of claim 5, wherein, the outer diameter of the core is expanded by heating the core.

7. The method of claim 1, wherein the core is hollow such that a pipe is formed.

8. The method of claim 2, further comprising reducing the diameter of the metal layer to such an extent that the metal layer presses against the core.

9. The method of claim 8, further comprising annealing the metal layer for increasing its flexibility after the diameter of the metal layer has been reduced.

10. The method of claim 9, wherein the core comprises tie material on its outer surface and the tie material is activated simultaneously with the annealing.

11. A method of manufacturing a pipe, said method comprising forming a hollow core having an outer surface of plastic, extruding a seamless metal layer on the core allowing a clearance between the metal layer and the core, cooling the metal layer, arranging the outer surface of the core against the inner surface of the metal layer, arranging an adhesive action between the core and the metal layer by activating a material adhering the core and the metal layer together by heat, sucking a vacuum in said clearance for improving the adhesion between the core and the metal layer, and arranging a permanent compressive force for compressing the core and the metal layer together.

12. A method of manufacturing an elongated product, said method comprising forming a core having an outer surface of plastic, extruding a seamless metal layer on the core allowing a clearance between the metal layer and the core, cooling the metal layer, arranging the outer surface of the core against the inner surface of the metal layer, arranging an adhesive action between the core and the metal layer by activating a material adhering the core and the metal layer together by residual heat in the metal layer, and arranging a permanent compressive force for compressing the core and the metal layer together.

\* \* \* \* \*

UNITED STATES PATENT AND TRADEMARK OFFICE
CERTIFICATE OF CORRECTION

PATENT NO. : 8,453,310 B2  
APPLICATION NO. : 12/162528  
DATED : June 4, 2013  
INVENTOR(S) : Jyri Järvenkylä et al.

Page 1 of 1

It is certified that error appears in the above-identified patent and that said Letters Patent is hereby corrected as shown below:

On the title page, item (73) should read

-- (73) Assignee: Uponor Innovation AB, Fristad (SE) --

Signed and Sealed this
Eighth Day of October, 2013

Teresa Stanek Rea
*Deputy Director of the United States Patent and Trademark Office*